United States Patent [19]

Kawamura et al.

[11] Patent Number: 4,623,995
[45] Date of Patent: Nov. 18, 1986

[54] RECORDING DISC REPRODUCING DEVICE

[75] Inventors: Ichiro Kawamura; Yoshitaka Fojioka; Makoto Fujita, all of Osaka, Japan

[73] Assignee: Matsushita Electric Industrial Co., Ltd., Kadoma, Japan

[21] Appl. No.: 740,273

[22] PCT Filed: Sep. 17, 1984

[86] PCT No.: PCT/JP84/00449
§ 371 Date: May 9, 1985
§ 102(e) Date: May 9, 1985

[87] PCT Pub. No.: WO85/01383
PCT Pub. Date: Mar. 28, 1985

[30] Foreign Application Priority Data

Sep. 16, 1983 [JP] Japan ............................ 58-171841

[51] Int. Cl.⁴ .............................................. G11B 1/00
[52] U.S. Cl. ...................................... 369/77.2; 369/292
[58] Field of Search .............................. 369/77.2, 292

[56] References Cited

U.S. PATENT DOCUMENTS

| 4,395,744 | 7/1983 | Saito et al. | 369/77.2 |
| 4,408,316 | 10/1983 | Saito | 369/77.2 |
| 4,482,991 | 11/1984 | Kawamura et al. | 369/77.2 |
| 4,500,983 | 2/1985 | Sugiyama et al. | 369/77.2 |

Primary Examiner—Steven L. Stephan
Attorney, Agent, or Firm—Wenderoth, Lind & Ponack

[57] ABSTRACT

The present invention relates to a recording disc reproducing device wherein a disc like recording medium is held in a disc case having an opening at one end thereof, for insertion and removal of the disc like recording medium. The disc like recording medium remains inside the body of the device after pulling out the disc case which has been inserted to a predetermined position in the body of the device. The opening of the disc case inserted into the body of the device is expanded to be opened by an opening mechanism and after the disc case has been inserted part way into the device the disc case is secured by a latch connected to the opening mechanism. Further movement of the disc case into the device is possible after the latch engages the disc case.

5 Claims, 26 Drawing Figures

RECORDING DISC REPRODUCING DEVICE

FIELD OF THE INVENTION

The present invention relates to a recording disc reproducing device, wherein after a record case containing a recording medium (a record) in the shape of a disc is inserted to a predetermined position in the body of said device, said record is placed automatically on the turntable provided in said device by pulling out said record case, and when recovering said record an empty record case is inserted into the body of said device to thereby automatically recover said record case on the turntable.

BACKGROUND OF THE INVENTION

Figure 1:
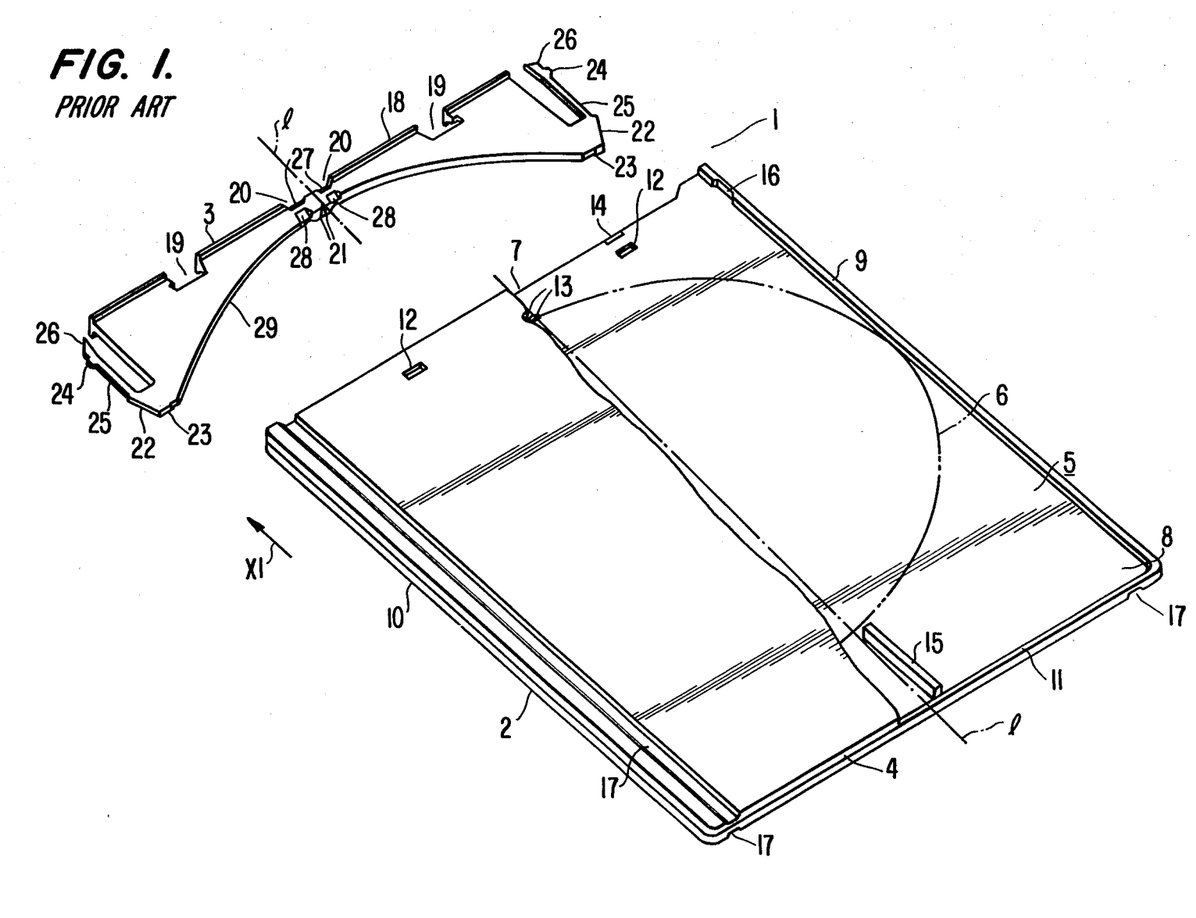
FIG. 1 is a partly sectional perspective illustration showing an example of the record case used in the present invention.
Figure 2:
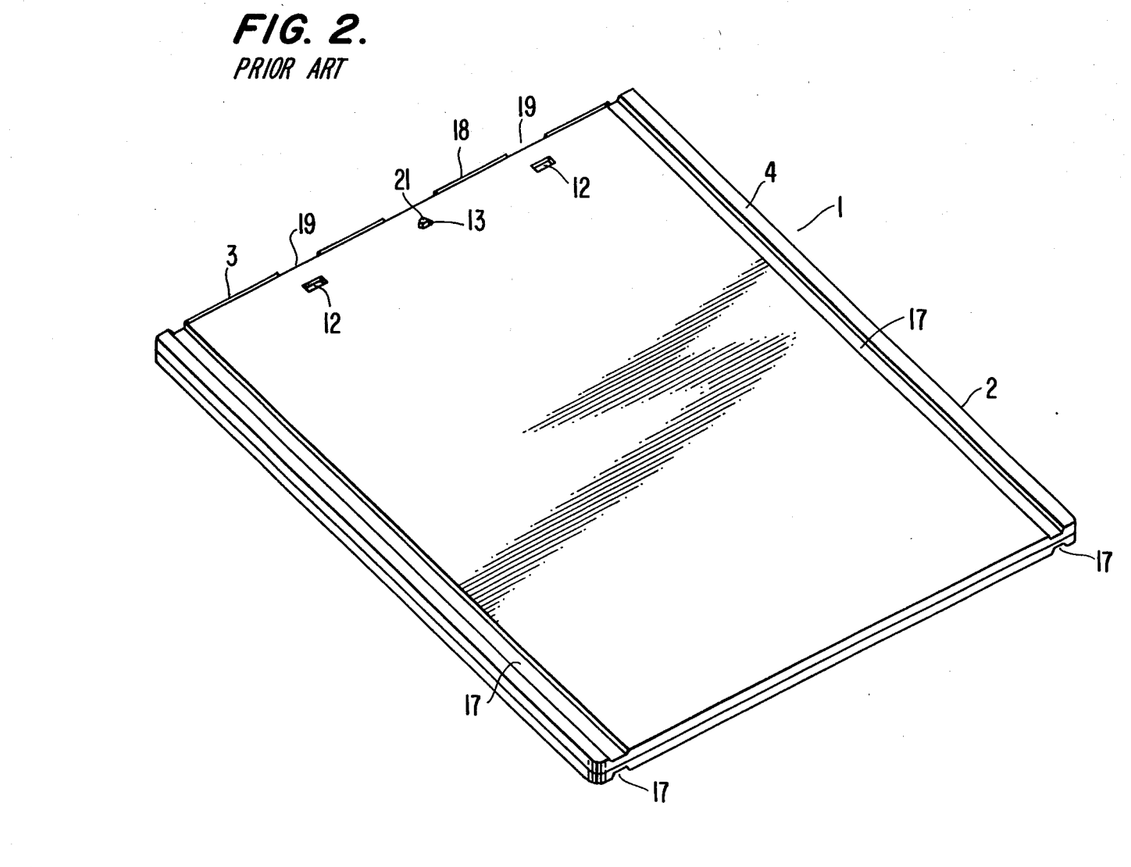
FIG. 2 is a perspective illustration showing the holding condition of the same record.
Figure 3A:
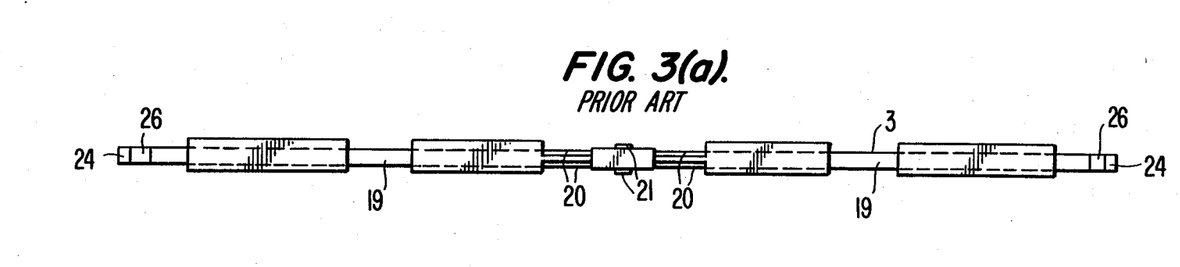
FIGS. 3a, b and c the front view, plan view and side view of the cover of the same record case respectively.
Figure 3B:
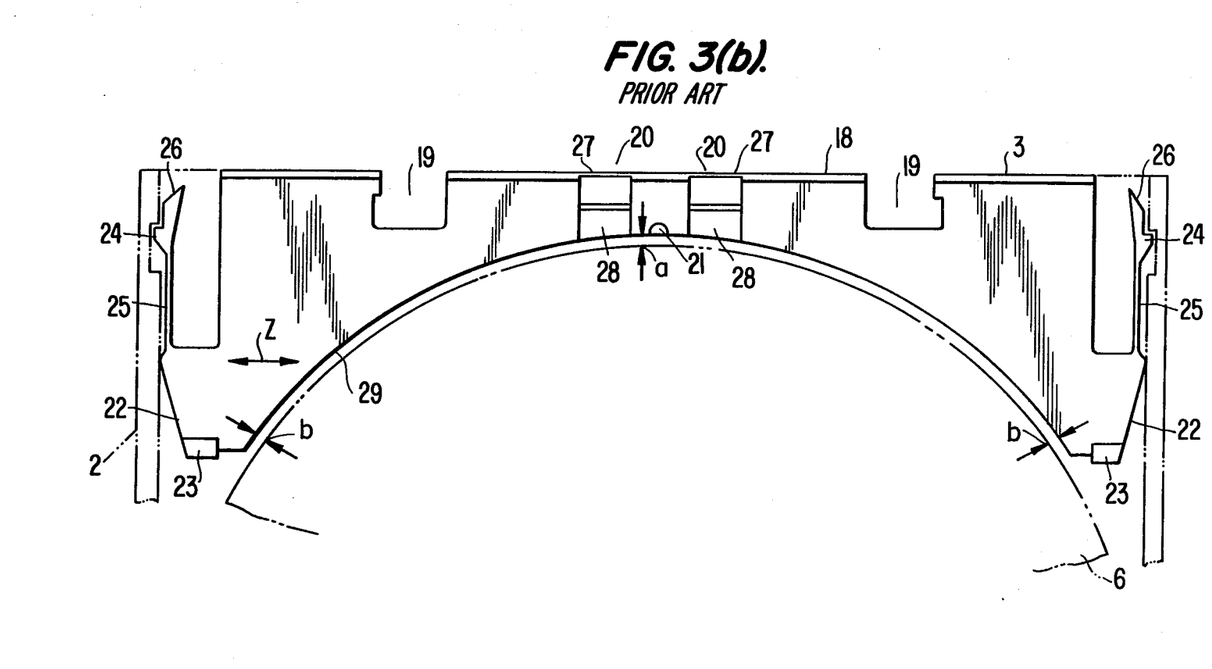
Figure 3C:
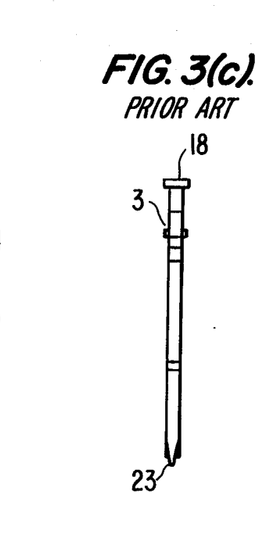

FIG. 1 through FIG. 3 show the structures of the disc case which can be used for the recording disc reproducing device according to the present invention, wherein a disc case 1 in the shape of a rectangle is composed of a disc case body 2 (hereinafter referred to as the case) and a cover 3 to be detachably combined with the opening 7 provided at the front side of the inserting direction $X_1$ toward the device of the case 2. The case 2 and the cover 3 are formed for example from styrol resin.

The case 2 is formed by a pair of half bodies 4 which are molded by the same die and pasted together, the inside of which is provided with the disc holding space 5 (whose height is a little greater than the thickness of the disc 6) which is flat over its entire width and length, and the disc 6 (a recording medium) is held in this space 5. This space 5 has the opening 7 on the side of the inserting direction $X_1$ and the sides of the remaining three directions are blocked.

Further, the same components of the case 2 are so disposed as to be positioned at right and left sides with respect to the centerline 1 as the center in the inserting direction.

Each half body 4 consists of a plate 8 having recessions 17 on the right and left sides (which serve to cause a hinge action as will be described below) and the ribs 9, 10, 11 provided along the three edges of this plate. With respect to the lower half body 4 shown in FIG. 1, the windows 12, with which the later described opening arms engage, are formed at right and left sides in the neighborhood on the side of the opening 7 and the holes 13, with which the later described bosses of the cover engage, are formed at the central portion in the neighborhood of the opening 7. A pair of tapers 14 are formed symmetrically on the edges of the opening 7. Such tapers are for guiding the insertion of the arms of the later described latching mechanisms. At the inner portion the stoppers 15, to which the disc 6 butts, are formed at the positions deviated toward right and left from the centerline 1.

Furthermore, on the inside in the neighborhood of the opening of the ribs 9, 10, recessions 16 are provided with which the later described bosses of the cover 3 engage. The half bodies 4, thus formed, are bonded together with an adhesive which is wholly or partially applied to the periphery of the ribs 9, 10, 11.

At the end of the cover 3, a flange 18 is provided to close the opening 7 of the case 2 when the cover 3 is engaged and secured with the case 2. The cover includes notches 19 into which the later described opening arms can enter, slopes 27 which guide the later described disc holding arm in the reproducing device, and guide grooves 20 having thin portions 28 which are thinner than the glue guard of the disc 6 and are formed symmetrically to the centerline 1 on both faces. Bosses 21 are formed on the centerline 1 of both faces which engage with the holes 13 of said case 2. Furthermore, slopes 22 and tapers 23 are provided to guide the cover 3 as it enters the case 2. Protuberances 24 are provided which engage with said recessions 16 to thereby fix the cover 3 to the case 2. Arms 25, having the flexibility of resin, are provided at their ends with slopes 26 which engage with the releasing members of the cover 3.

FIG. 2 shows the conditions of the disc 6 and cover 3 as assembled into the case 2. Such conditions are illustrated with respect to FIG. 1, wherein the disc 6 butts against the stoppers 15 to be secured in the direction of depth and secured as well as by the ribs 9, 10 in the direction of width.

The cover 3 closes the opening 7 and is joined together therewith by the protuberances 24 engaging with the recessions 16 and by the bosses 21 engaging with the holes 13.

With the cover thus closed, the disc 6 is limited in movement by the circular arcs 29 of the cover 3 with respect to the inserting direction $X_1$ as well, so that the disc 6 is held in the case 2 without falling out therefrom. Furthermore, the thickness of the portion of the cover 3 entering the case 2 is almost the same as the thickness of the disc holding space 5 of the case 2 and the disc 6 will not therefore fall through the clearance therebetween.

FIG. 3 is a detail view of portions of the cover 3, wherein the shape opposing the disc 6 is formed by circular arc which, for example, provides greater clearances 'b' at both ends as compared to the clearance 'a' at the central portion. This spacing allows the disc 6 to operate stably even if the cover 3 and the record 6 are displaced from their relative positions more or less in the directions Z shown by the arrows.

Figures 4A, 4B:
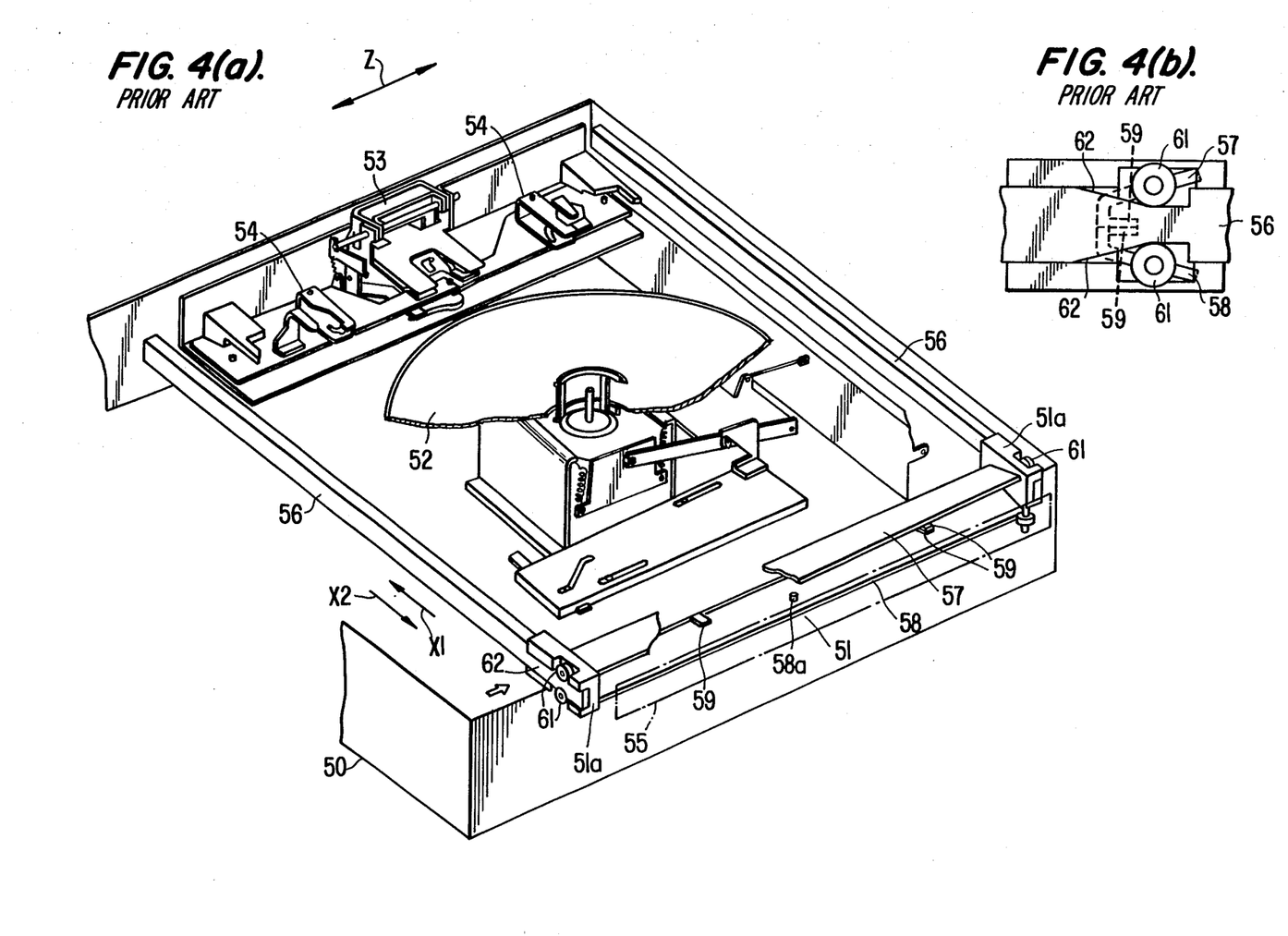
FIG. 4a is a partly sectional perspective illustration showing the structure of the recording disc reproducing device of the prior art and FIG. 4b is a sectional side elevation of main parts.
Figure 5A:
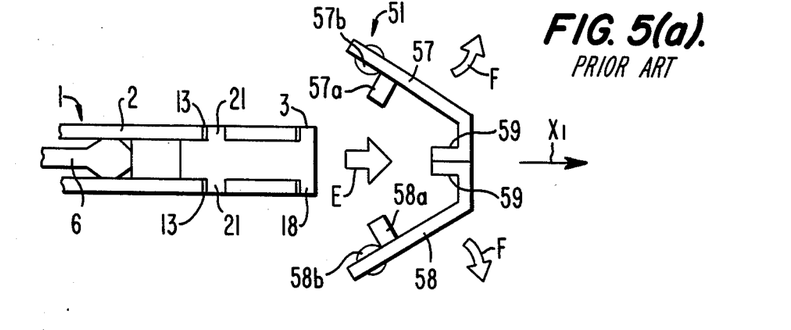
FIGS. 5a–d show the operation of a prior art opening device

FIG. 4 is a schematic illustration of an example of the conventional recording disc reproducing device which uses the disc case as mentioned above. This reproducing device 50 has such mechanisms as an opening mechanism 51 which expands to open the opening 7 of the case 2, a turntable 52 on which the disc 6 is placed, a mechanism 53 which holds the disc 6 and mechanisms 54 which latch the cover 3. The opening mechanism 51 of the case 2 is located in the neighborhood of the disc case inserting slot 55 of the reproducing device 50 and both sides of the opening mechanism 51 are guided by the guide rails 56 to move reversibly in the directions of $X_1$ and $X_2$ shown by the arrows. This opening mechanism 51 consists of the upper beam 57 and the lower beam 58 which extend in the direction of width of the reproducing device 50, each beam 57 and 58 are pivotally connected at each end to a moving body 51a which slides over said guide rails 56, by means of pivot pins 57b, 58b (refer to FIG. 5), and has the protuberances 57a, 58a which cooperate with a pair of opening arms 59 to engage the holes 13 of the case. Each beam 57, 58, when located in the neighbourhood of the disc case inserting slot 55, is slanted so as to cause the opening arms 59 of both beams 57, 58 to be held together by the action of the coil spring or the like.

As the opening mechanism 51 moves in the direction $X_1$ (shown by the arrow) and the rollers 61, which are rotatably attached to the beams 57 and 58, ride over the tapers 62 formed at the ends of the guide rails 56 and then respectively rotate so as to be over the horizontal top surfaces thereof such that the beams 57 and 58 pivot and the opening arms 59 separate in the vertical direction away from each other.

In the construction as described above, when the disc case 1 is inserted into the reproducing device 50 through the slot 55 with the cover 3 facing the front, the opening arms 59, which are closed, enter the notches 19 of the cover 3, and the case opening mechanism 51 is pushed by the inserting motion of the cartridge to thereby move in the direction of the arrow $X_1$.

Furthermore, the opening arms 59 are caused to enter the case 2 by the action of the tapers 14 provided at the opening 7 of the case 2. At this time, the tips of the opening arms 59 are positioned at respective locations corresponding to the windows 12 of the case 2. When the case opening mechanism 51 is moved, the opening arms 59 are rotated in the direction shown by arrow F wherein they move away from each other and as the case 2 is expanded the protuberances 57a, 58a engage with the holes 13 in the case to thereby expand and open the case 2. Hereafter, the case 2 is inserted into the direction of the arrow $X_1$ as held in expanded and opened condition. Thus, since the case 2 is provided with the recessions 17 as mentioned above, expanding and opening actions of the above are interlocked by the inserting motion with relatively light force. Since the protuberances 24 of said cover 3 are engaged with the recessions 16 of the case 2 in the expanded and opened condition as well, the cover 3 moves together with the case 2. Thus, a situation is avoided wherein only the cover 3 is left in the reproducing device 50, even if the case is pulled out halfway. Furthermore, structures and motions of the turntable 52, holding mechanism 53, cover latching mechanisms 54 as well as those of other mechanisms are the same, such as, for example those of the prior art stated in the Japanese laid open Pat. No. 57-205853.

Figure 5B:
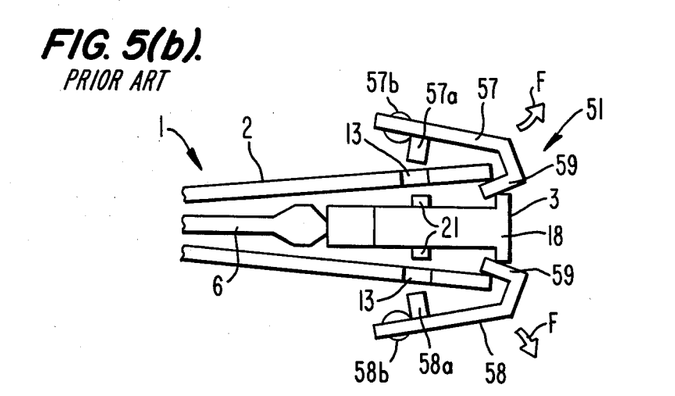

However, in the opening mechanism 51 of said prior art, there is the following problem, i.e., FIGS. 5a and b illustrate the motions of the opening mechanism 51 in relation to the disc case 1 while the motions of the opening mechanism 51 are as described above. Therefore, explanations will be given in stages so as to clarify problems which occur specifically in the example of the prior art.

FIG. 5a is illustrative of the condition of the case 2 before it butts against the opening mechanism 51. In this condition, as the case 2 butts against the opening mechanism 51 in the direction shown by the arrow E, the beams 57, 58 rotate in the direction shown by arrow F due to the action of the tapers 62 (refer to FIG. 4) to thereby expand and open the case.

FIG. 5b shows the condition of the case 2 being expanded to open, i.e., this is the condition wherein the rollers 61 are midway on the tapers 62 in FIG. 4. In this condition, the protuberances 57a, 58a are not yet engaged with the holes 13 of the case 2. However, since the rollers 61 are midway on the tapers 62, the rollers 61 can be returned to the condition shown in FIG. 5a by the action of said coil spring or the like.

Figure 5C:
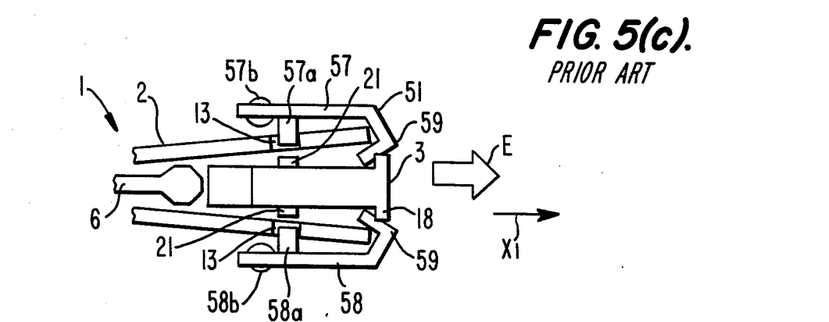

Expansion and opening of the case 2 proceed further, which are shown in FIG. 5c, until it is in the completely expanded and opened condition. In such a condition, the protuberances 57a, 58a are now engaged with the holes 13 of the case 2.

Under the normal using conditions on the part of users, the opening mechanism 51 operates as shown in (a), (b), (c) of FIG. 5 above. Furthermore, as the case is being taken out, the opening mechanism 51 operates in reverse order of the motions shown in (c) to (b) to (a) of FIG. 5. However, there may be cases in which users put in and take out the disc case 1 at an abnormally fast speed and the opening mechanism 51 is vibrated in the neighborhood of the slot 55 causing the opening mechanism 51 to operate in such order as (a) to (b) to (c) or (c) to (b) to (a). Under such operation, because the opening mechanism 51 has inertia to some extent, the opening mechanism 51 alone runs into the direction of the arrow E due to the impact given by the case 2 as it butts against the opening mechanism 51. As such, the holes 13 of the case 2 are not engaged completely with the protuberances 57a, 58a as shown in FIG. 5c but instead are in the condition shown in FIG. 5d. In other words, in spite of the case being in the neighborhood of the slot 55, the opening mechanism 51 will be positioned inside the reproducing device 50.

Figure 5D:
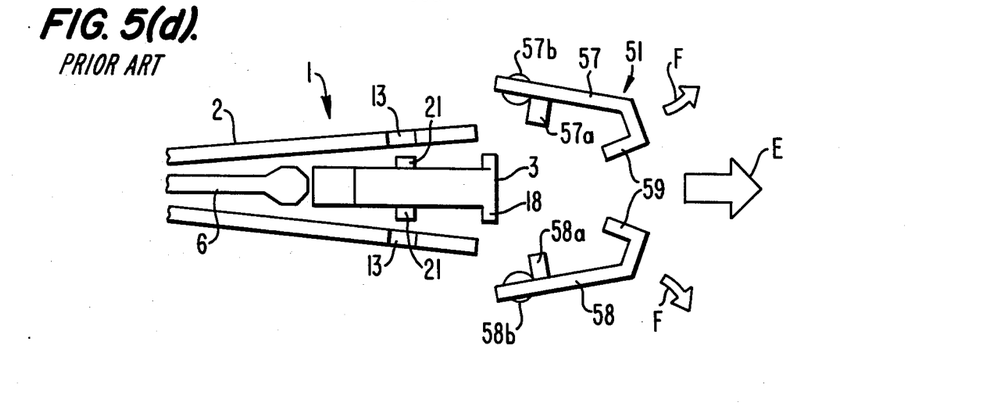

If the operation is under such a condition, the rollers 61 have completely ridden past the tapers 62 and it is impossible for the opening mechanism 51 to return to the neighborhood of the slot 55 by the force of said coil spring and the like.

Under such a condition, it is also impossible to insert the case 2 over again to thereby cause the opening mechanism 51 to normally operate therefore the reproducing device 50 must be overhauled and repaired so as to put the opening mechanism 51 back into the normal operating conditon. Namely, should abnormal conditions such as above occur once, the normal conditions cannot be resumed by the users thereby making it impossible to reproduce the disc. Of course, such abnormal conditions do not necessarily occur frequently, but they are the problems which exist and must be solved in order to improve the reliability of the recording device since such conditions can result in considerable trouble should they happen even once.

OBJECTS OF THE INVENTION

It is among the objects of the present invention to solve the problems mentioned above to thereby enhance the reliability of the reproducing device. To materialize such objects, the present invention employs an assembly wherein said opening is expanded to open by an opening mechanism which expands to open the opening of the disc case by interlocking with the inserting motion into the device of the disc case, only after said disc case has been engaged and secured by the latching means, which is provided movably as one unit with said opening mechanism. The opening mechanism is movable together with the record case toward the inner portion of the device, and by the assembly of the invention, the problem in which only said opening mechanism moves into the inner portion of the device is eliminated.

BEST MODE TO IMPLEMENT THE INVENTION

Figures 6, 7:
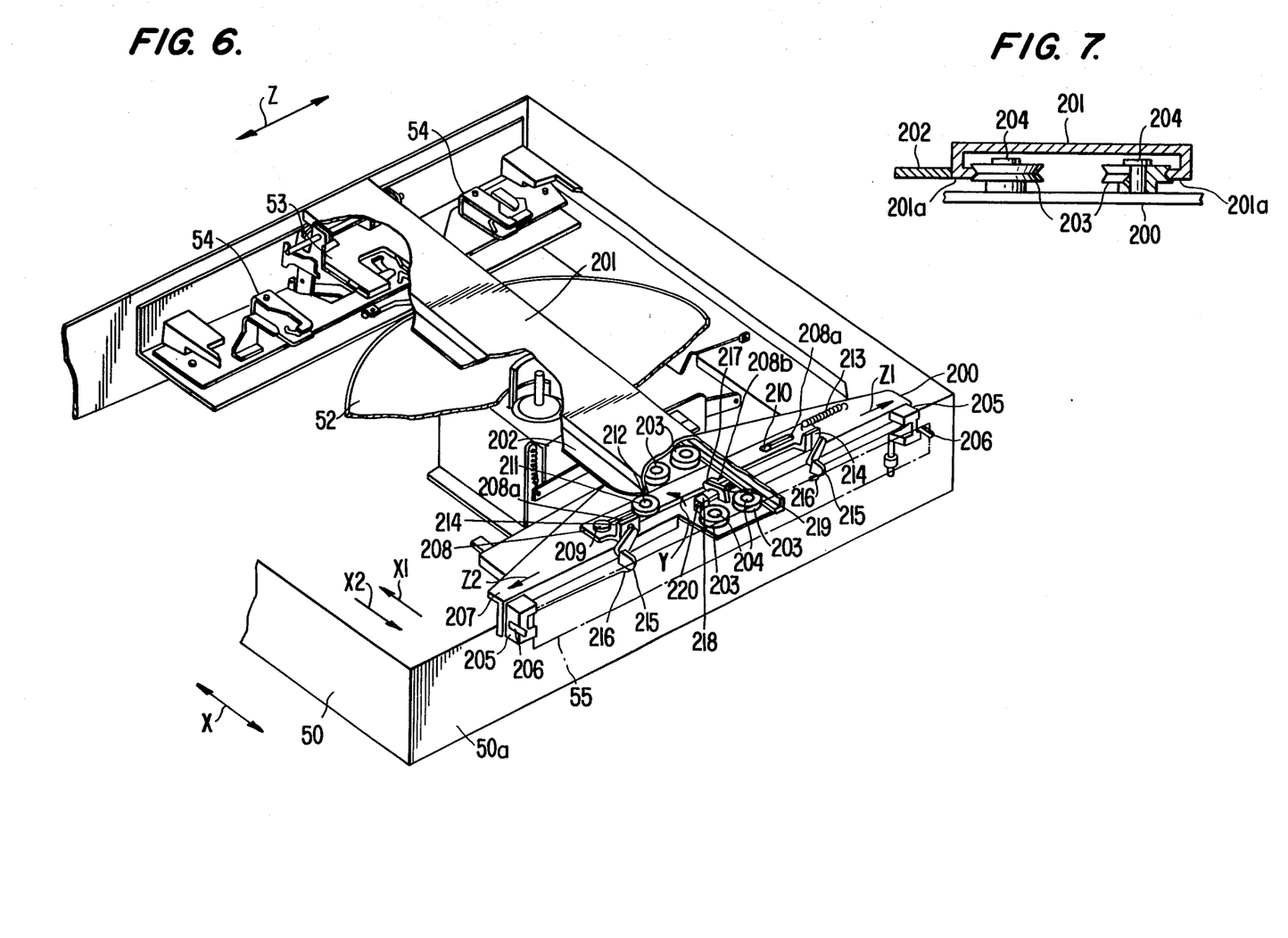
FIG. 6 is a partly sectional perspective illustration showing the structure of the recording disc reproducing device according to the present invention.
FIG. 7 is a section view of main parts of FIG. 6.
Figure 8A:
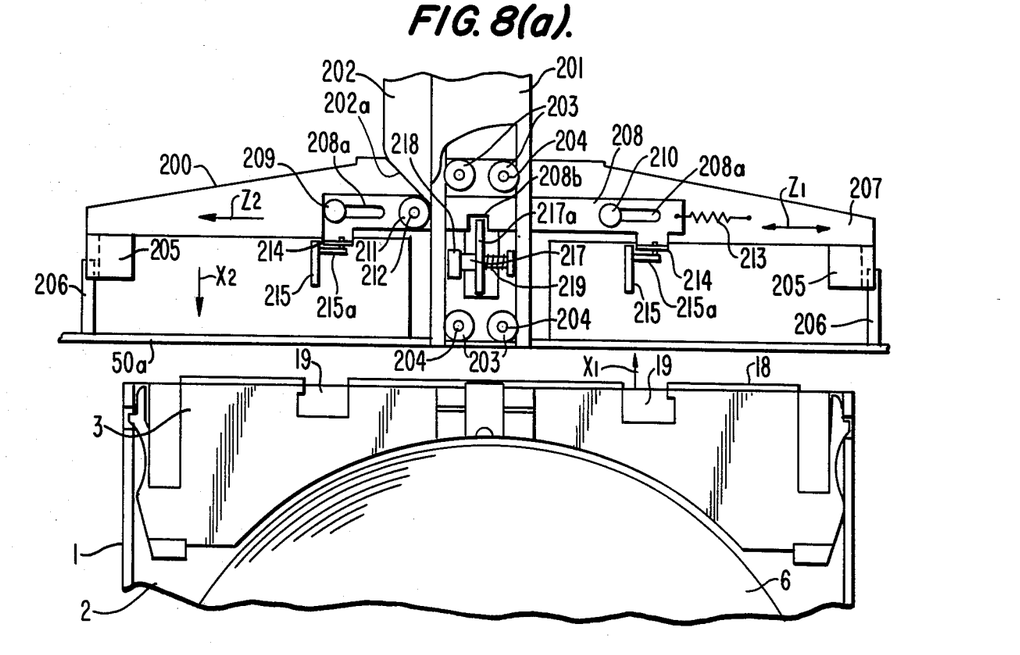
FIG. 8a is a top view of the reproducing device showing the motion of the opening mechanism.
Figure 8B:
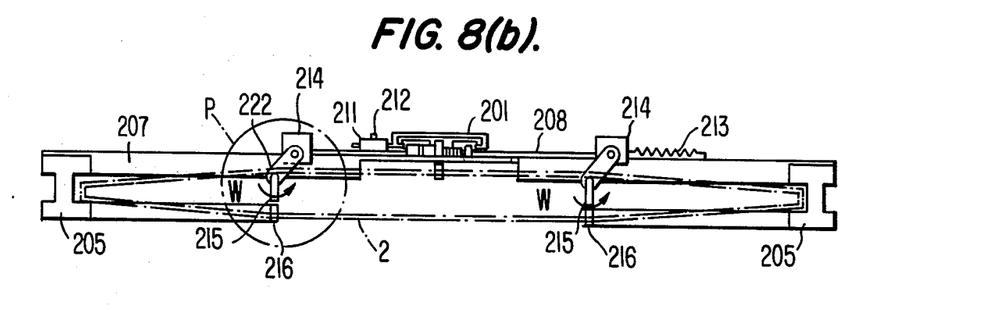
FIG. 8b is a front view of the same opening mechanism, and of FIG. 8c is an enlarged front view of main parts of the same opening mechanism.
Figure 8C:
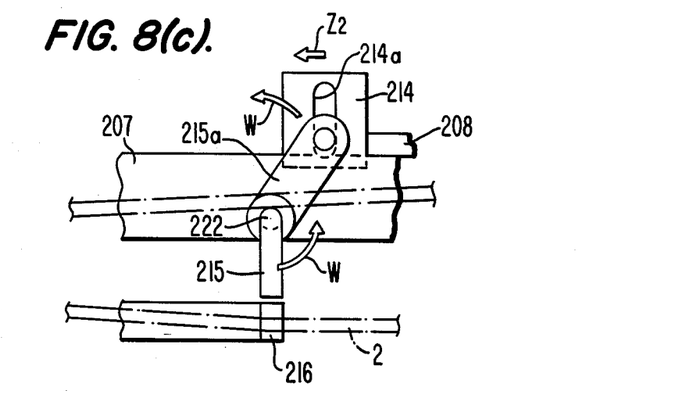

FIG. 6 through FIG. 8 show the fundamental structures of the embodiments of the recording disc reproducing device according to the present invention. FIG. 6 shows the embodiments which combine the opening mechanism 200 according to the present invention instead of the opening mechanism 51 of the prior art, with respect to the reproducing device 50 of said prior art.

The opening mechanism 200 is composed so as to move along a rail 201 which is fixed above the upper part of the turntable 52 of the reproducing device 50. A cam plate 202 is fixed on the side of the rail 201. Rollers 203, attached by pins 204 to a base 207, roll along the rail.

Fixed on both sides of the base 207 are guiding members 205 which function to guide both sides of the case 2. These guiding members 205 simultaneously engage with wedge shaped members holding 206, which are fixed to the front panel 50a of the reproducing device 50, to thereby restrict the opening mechanism 200 from moving in the vertical directions as shown in FIG. 8a when the opening mechanism 200 is in the neighborhood of the slot 55.

A slide plate 208 is supported slidably on the base 207 only in the direction of $Z_1$, $Z_2$ (shown in FIGS. 6 and 8) by means of pins 209, 210 fitted into the base 207 and a slot 208a. A roller 211 can be butted against the cam plate 202 and is supported rotatably on the slide plate 208 by means of the pin 212. A coil spring 213 is arranged between the base 207 and the slide plate 208 and provides a force to bias the slide plate 208 in the direction of $Z_1$ (as shown in FIG. 6). Engaging members 214 are secured to slide plate 208 and cause opening members 215 to interlock with the slide plate 208. The opening members 215 are supported for rotational movement on the base 207. Below opening members 215 are supporting members 216 which are secured to the base 207. A latch 217 engages with the hole 13 of the case 2 and is supported on the base 207 to move rotatably as shown by the arrow Y in FIGS. 6, 9a and 9b, by means of a bearing 218 and the pin 220. Further, the latch 217 is biased with a force in the direction of the arrow Y by means of the spring 219.

FIG. 7 shows the structures of the opening mechanism 200 and the rail 201. The section of the rail 201 is formed into the shape of the letter C as shown in the illustration. This shape can be easily produced for example by extrusion of aluminum. Each roller 203 has a V-shaped groove formed on its outer periphery (as shown) so that these grooves fit the guiding parts 201a of the rail 201 to thereby permit rollers 203 to roll along rail 201.

Four rollers 204 are guided, respectively, in such manner as described above and are disposed (as shown in FIG. 6) to move the opening mechanism 200 and therefore guide the movement of the case 2 in a stable condition in a direction X from the front to the rear of the reproducing device 50.

The above description sets forth the general structural characteristics of the reproducing device according to the present invention, and the following explanation will focus on the motions of the opening device 200.

FIGS. 8a–c are perspective views of the motions of the opening mechanism 200 as seen from the top and front of the reproducing device, respectively. These illustrations represent the conditions of the case 2 before it is inserted into the reproducing device 50. FIG. 8b is an enlarged view of the portion P shown in FIG. 8c. Because the slide plate 208 is given a force in the direction of $Z_1$ by means of the coil spring 213, the roller fitted to the slide plate 208 is also provided with a force in the direction of $Z_1$. And, by the action of the slope of the cam plate 202, the whole opening mechanism 200 is moved into the direction of $Z_2$ to be pushed against the front plate 50a. If the opening mechanism 200 should be pushed into the direction of $X_1$ in FIG. 8 by some force or due to some other condition, the slide plate 208 cannot move into the direction $Z_2$ in FIG. 8 because the end 217a of the latch 217 and the notch 208b provided with the slide plate 208 are engaged.

Therefore, it is not possible for the roller 211 to roll up the slope 202a causing the opening mechanism 200 to move into the direction of $X_1$. With respect to the opening mechanism 200 under such a condition, the disc case 1 containing the disc 6 or the empty disc case 1 will be inserted. FIG. 8a shows the disc case 1 holding the disc 6, with the part of the disc case 1 being cut away. When the disc case 1 is inserted into the direction of $X_1$ under the condition described above, the disc case 1 is guided by the guiding members 205 to thereby butt against the opening members 215. Further, the opening members 215 are provided at positions respectively corresponding to the notches 19 of the cover 3, therefore, it is not possible that the cover 3 interferes with the opening members 215. As shown in FIG. 8c, the opening members 215 are engaged with the slots 214a drilled into the engaging members 214, by means of the pivotal arm sections 215a, which are pivotally attached at fulcrums 222 to opening members 215. When the slide plate 208 is slid into the direction of $Z_2$ (shown in FIGS. 8b and c), the opening members 215 are caused to rotate centering on the fulcrum 222 in the direction of W.

Figure 9A:
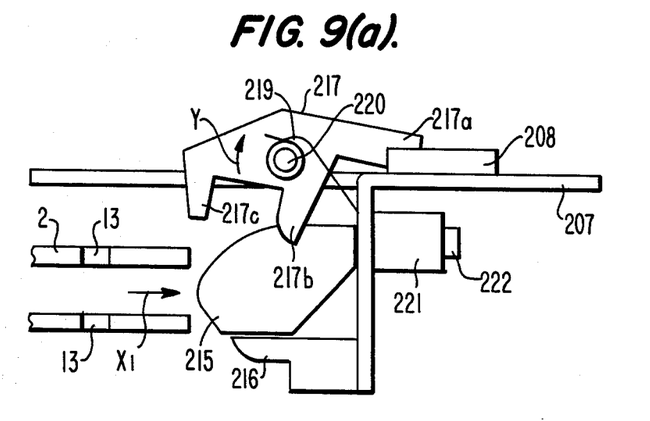
FIGS. 9a–c are transverse sectional views illustrative of the motion of the opening member and the latch during the case insertion.
Figure 9B:
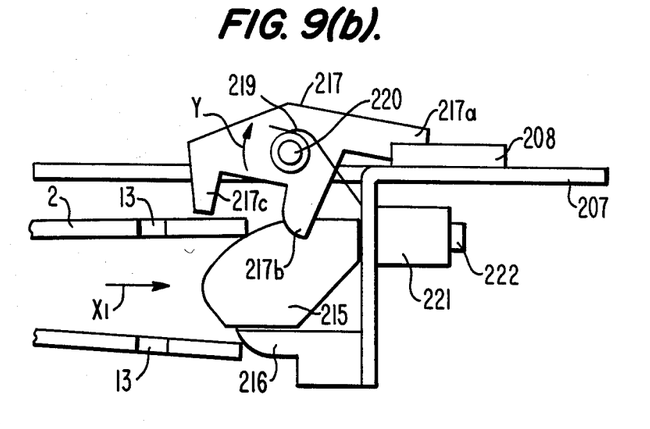
Figure 9C:
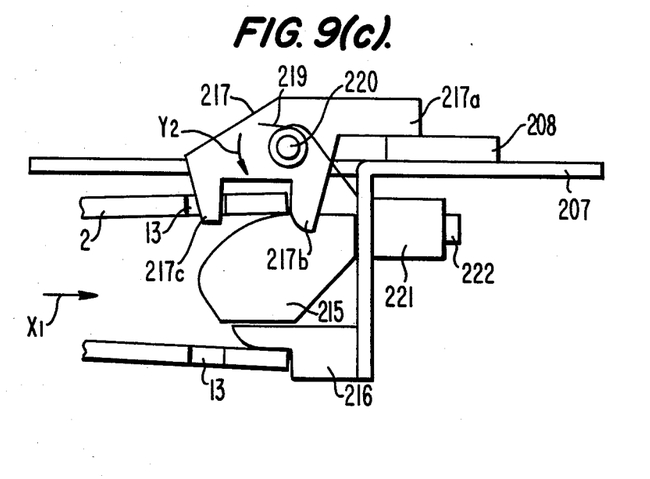

Now, the motion will be explained in connection with the opening members 215 and the latch 217 during the insertion of the record case 1. FIGS. 9a–c are transverse sectional views of the opening mechanism 200 illustrating the motions of the opening members 215 and the latch 217 while the case 2 is being inserted.

For the convenience of easy understanding of the illustration, the disc 6 and the cover 3 are not shown. As shown in FIG. 9a, the latch 217 is held by the spring 219 in the direction of the arrow Y in the illustration. Under such a condition, because the notch 208b of the slide plate 208 is engaged with the end 217a of the latch 217, the slide plate 208 cannot move in the direction of $Z_2$. The opening member 215 is combined with the supporting member 216 as shown so as to guide the case 2 and the side of the opening member 215 is formed into a shape which compliments the shape of the supporting members to thereby facilitate expanding and opening the case 2 easily. As shown, the slide plate has a bearing 221 which receives a fulcrum or pivot pin 222 fixed to the opening member 215, whereby the opening member 215 is mounted so as to be able to move rotatably as mentioned above.

When the case 2 is pushed to butt into the opening member 215 in the direction of $X_1$, the case 2 is expanded to open along the slopes of the opening member 215 as shown in FIG. 9b. As the case 2 further advances in the direction of $X_1$, the lower part of the case 2 moves from the opening mechanism 215 over to the supporting member 216 to be further expanded to open. As the case 2 advances further in the direction of $X_1$, the end of the case 2 butts against a projection 217b of the latch 217 (as shown in FIG. 9c) the latch 217 moves 90 degrees to rotate in the direction of $Y_2$. At the same time, the engaged end 217c of the latch 217 enters the hole 13 of the case 2 to thereby secure the case 2. Under such conditions, the case is expanded and opened as shown and supported by the opening member 215 and the supporting member 216.

At this point of end 217a of the latch 217 and the notch 208b of the slide plate 208 are disengaged, so that the slide plate 208 can be slid into the direction of $Z_2$.

As the case 2 is pushed in further, the slide plate 208 is free to slide in the direction of $Z_2$, permitting the roller 211 in FIG. 8 to roll up the slope 202a of the cam plate 202 and the opening mechanism 200 to move together with the case 2 in the direction of $X_1$. Under this condition, the movement of the slide plate 208 in the direction of $Z_2$ causes the latch 217 to be maintained in the position shown in FIG. 9c with the end 217a held by means of the slide plate 208. Therefore, it is not possible to release engagement of the hole 13 of the case 2 with the engaged end 217c of the latch 217. By such an arrangement, when the disc case 1 is inserted into the device 50, the case 2 can be moved inside the reproducing device 50 in a condition wherein the case 2 is being expanded and opened by the opening mechanism 200.

Figure 10A:
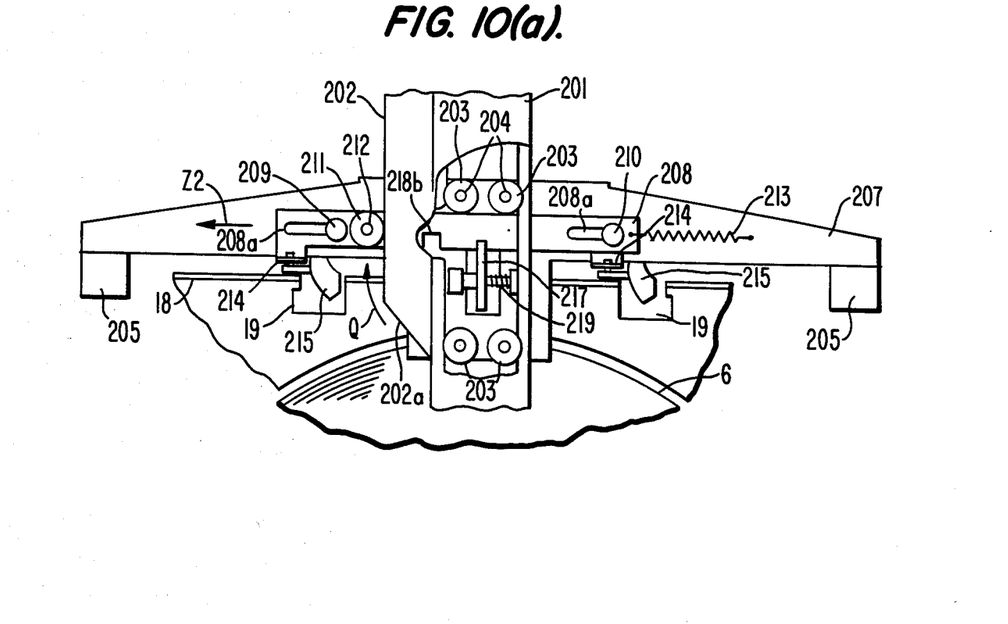
FIG. 10a is a plan view showing the expanded and opened condition of the case.
Figure 10B:
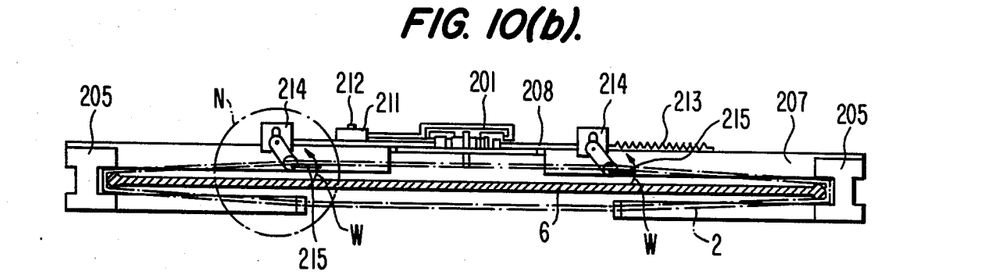
FIG. 10b is the front view of the same case.
Figure 10C:
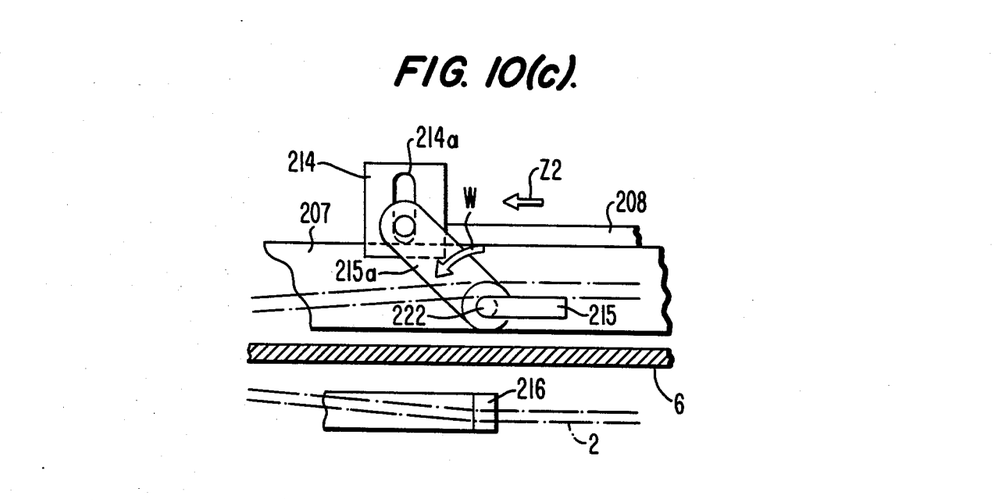
FIG. 10c is an enlarged front view of main parts of the same case.

FIG. 10a illustrates a condition where the roller 211 has traveled up the slope 202a in the direction of the arrow Q in the illustration. Under this condition, as the slide plate 208 slides in the direction of $Z_2$, the opening member 215 is rotated in the direction of W with the case 2 being expanded and opened thereby not preventing the disc 6 or the cover 3 from entering and coming out of the case 2. FIG. 10c is an enlarged view of the portion N of FIG. 10b.

When the disc case 1 is being pulled out, the opening mechanism 200 operates in complete reverse order from the explanation given above. In other words, the opening mechanism 200 being pulled by the case 2 moves into the direction of $X_2$, and as the roller 211 approaches the slope 202a the roller 211 rolls down the slope 202a by the force of the coil spring 213.

At the same time, the slide plate 208 slides into the direction of $Z_1$ to be returned into the condition shown in a FIG. 8a. As such, the latch 217, which is held by slide plate 208 in the state shown in FIG. 9c is caused to rotate in the direction of Y by the force of the spring 219 thereby releasing the engagement of the case 2 with the latch 217 and returning the opening mechanism 200 to its original state.

Figure 11A:
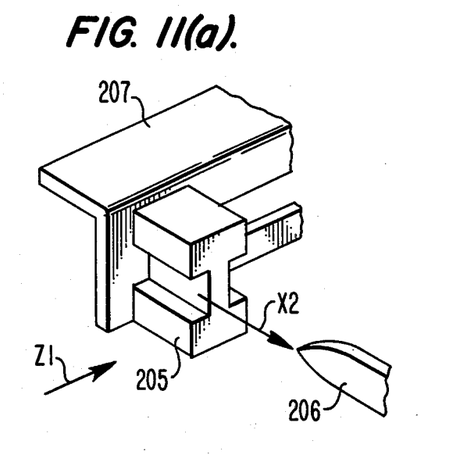
FIG. 11a is a perspective illustration showing the engagement of the holding member with the member to be held and FIG. 11b is a side view of the same engagement.
Figure 11B:
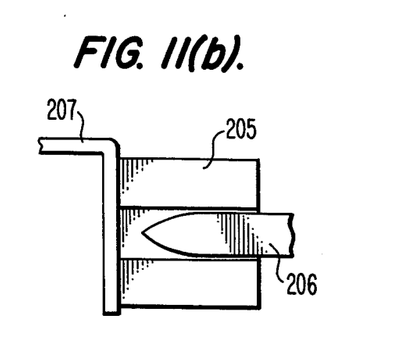

At this time, as shown in FIG. 11a, because the guiding member 205 engages with the wedge shaped holding member 206, which is fixed to the front plate 50a, so as to be in the condition shown in FIG. 11b, it is not possible for the opening mechanism 200 to vibrate in the vertical direction or for any problems to occur, such as for example in case where the reproducing device 50 is dropped in the packed condition.

Because there is less clearance or movements in the device, the disc case 1 can be smoothly inserted.

Figure 12:
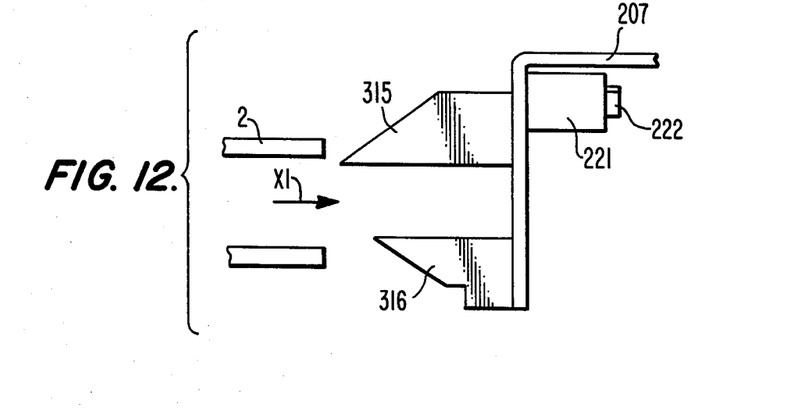
FIG. 12 is a side view showing other embodiment of the opening mechanism.
Figure 13:
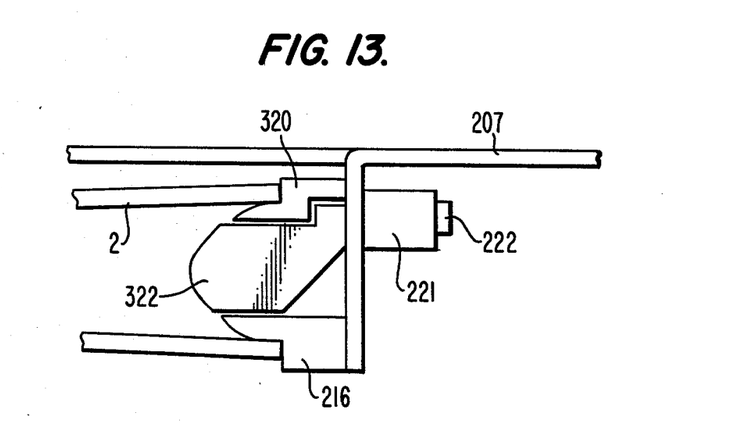
FIG. 13 is a side view of another embodiment showing the opening mechanism.

It is also possible to form the opening members and the supporting members into the shape not only limiting thereto of the shell shown in FIG. 9 but also both of the opening member 315 and a supporting member 316 can be made into the form of simple slopes, as shown in FIG. 12 for example. Furthermore, it is also possible to form the opening members for example by providing a movable opening member 322 which moves to rotate centering on the fulcrum 222 and a fixed opening mechanism 320 which functions similarly as the supporting member 216 as shown in FIG. 13.

The above description sets forth the embodiments of the opening mechanism according to the present invention, however, the structures and motions of other parts of the reproducing device 50 are quite the same as those of the prior art.

POSSIBILITY OF UTILIZATION FOR INDUSTRIAL PURPOSE

According to the present invention, as described above, the opening mechanism is prevented from moving into the inner portion of the device until after the case is expanded to be opened and moved up to a predetermined position when the latch is secured to the case. As a result, it is not possible for problems to occur such as separation of the case from the opening mechanism thereby causing the opening mechanism to run by itself. In the reproducing device of the present invention the disc like recording medium is held in the case, the case is inserted into the reproducing device to place the disc like recording medium on the turntable and the stable loading of the disc like recording medium can be expected.

What is claimed is:

1. A recording disc reproducing device for use with a disc case having a flat rectangular box shaped case body with an opening at one end thereof, the interior of the case body being sized for holding a disc like recording medium and the case body having an engaging hole located near the opening of the case body, the disc case further including a cover removably received in the opening of the case body, the recording disc reproducing device comprising:

a housing having a front side with an elongated inserting slot therein through which the disc case is inserted;

holding means, disposed at a rear part of the reproducing device, for holding the recording disc within the reproducing device after a disc case has been inserted into and withdrawn from the reproducing device;

turntable means, positioned between said inserting slot and a rear part of the reproducing device, for rotating the recording disc;

a rail disposed in said housing extending in a longitudinal direction along which a record disc is inserted into and removed from the recording device;

a base slidably supported on said rail from a first position near said inserting slot to a second position along said longitudinal direction towards the rear part of the reproducing device;

an opening means disposed on said base for expanding the opening of a disc case which is inserted through said disc case inserting slot;

an engaging means disposed on said base for removably engaging with the engaging hole of a disc case which is inserted through said inserting slot to thereby secure the disc case with respect to said base;

a slide controlling means disposed between said base and said rail for either preventing or allowing said base to slide along said rail; and a coupling means, operatively connected to said engaging means and said slide controlling means, for causing said slide controlling means to prevent said base from sliding along said rail except when said engaging means is engaged with the engaging hole of a disc case which has been inserted through said disc case inserting slot.

2. The recording disc reproducing device of claim 1, wherein said opening means includes at least one plate which is rotatable 90° from an initial position for expanding the opening of a disc case when said base is in said first position to another position, when said base slides along said rail to said second position, for maintaining the opening of a disc case in the expanded condition and allowing the recording disc to pass out of and into the disc case through the expanded opening.

3. The recording disc reproducing device of claim 1, wherein said engaging means is rotatably mounted on said base and includes a rotatable abutting part which engages the opening end of a disc case and rotates said engaging means when a disc case in inserted through said disc case inserting slot, a rotatable end part adapted to fit into the engaging hole of a disc case, and a rotatable engaging end which is removably connected to said coupling means to allow said coupling means to move to a position at which said base is free to slide along said rail.

4. The recording disc reproducing device of claim 1, wherein said slide controlling device includes a cam plate extending along a side of said rail.

5. The recording disc reproducing device of claim 4, wherein said coupling means comprises a plate which is slidable on said base in a direction which is perpendicular to the longitudinal direction of said rail, said slide controlling means further includes a roller rotatably mounted on said coupling means which travels along an inclined edge of said cam plate only when said engaging means is engaged with the engaging hole of a disc case inserted through said disc case inserting slot.

* * * * *